United States Patent
Patil et al.

(10) Patent No.: US 11,167,977 B2
(45) Date of Patent: *Nov. 9, 2021

(54) SYSTEMS AND METHODS FOR AUTOMATICALLY REFUELING VEHICLES OF CUSTOMERS OF A RETAILER

(71) Applicant: Walmart Apollo, LLC, Bentonville, AR (US)

(72) Inventors: Vijaysinha Patil, San Ramon, CA (US); Vimal Gnanaraj Nelson, Mountain House, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,923

(22) Filed: May 5, 2020

(65) Prior Publication Data
US 2020/0262695 A1    Aug. 20, 2020

Related U.S. Application Data

(63) Continuation of application No. 16/295,855, filed on Mar. 7, 2019, now Pat. No. 10,676,342.
(Continued)

(51) Int. Cl.
*G07F 13/02* (2006.01)
*B67D 7/04* (2010.01)
(Continued)

(52) U.S. Cl.
CPC ..... *B67D 7/0401* (2013.01); *G06Q 20/40145* (2013.01); *G06Q 30/0236* (2013.01); *G07F 13/025* (2013.01)

(58) Field of Classification Search
CPC ....... G07F 13/025; G06Q 20/20; G06Q 20/18
See application file for complete search history.

(56) References Cited

U.S. PATENT DOCUMENTS

| 3,931,497 A | 1/1976 | Gentile |
| 6,098,879 A | 8/2000 | Terranova |

(Continued)

FOREIGN PATENT DOCUMENTS

| WO | 97024689 | 7/1997 |
| WO | 2008004755 | 1/2008 |
| WO | 2019245947 | 12/2019 |

OTHER PUBLICATIONS

Breezepass; "Breeze is like an E-ZPass for Gas"; http://breezepass.com; available at least as early as Mar. 5, 2014; pp. 1-4.
(Continued)

*Primary Examiner* — Timothy R Waggoner
(74) *Attorney, Agent, or Firm* — Fitch, Even, Tabin & Flannery, LLP

(57) ABSTRACT

In some embodiments, methods and systems are provided for automatically refueling vehicles of authenticated customers of a retailer. After the vehicle driven by an operator is scanned at a refueling station of the retailer and identified as a vehicle associated with an authorized customer of the retailer, the operator and/or the operator's personal electronic device are scanned in order to verify that the operator of the authenticated vehicle is a customer of the retailer authorized to fill up his/her car at the refueling station of the retailer. When both the vehicle and the operator of the vehicle are authenticated and verified, a vehicle refueling device dispenses gasoline to fill up the gas tank of the vehicle.

20 Claims, 3 Drawing Sheets

Related U.S. Application Data

(60) Provisional application No. 62/687,439, filed on Jun. 20, 2018.

(51) Int. Cl.
  *G06Q 30/02* (2012.01)
  *G06Q 20/40* (2012.01)

(56) References Cited

U.S. PATENT DOCUMENTS

| | | |
|---|---|---|
| 6,237,647 B1 | 5/2001 | Pong |
| 6,264,103 B1 | 7/2001 | Stanley |
| 7,096,895 B2 | 8/2006 | Barker |
| 7,379,897 B2 | 5/2008 | Pinkus |
| 8,099,308 B2 | 1/2012 | Uyeki |
| 8,874,475 B2 | 10/2014 | Betancourt |
| 8,924,267 B1 | 12/2014 | Terranova |
| 9,715,682 B2 | 7/2017 | Webb |
| 9,811,801 B2 | 11/2017 | Gulli |
| 10,676,342 B2 * | 6/2020 | Patil ............ G06Q 20/401 |
| 2001/0020198 A1 | 9/2001 | Wilson |
| 2003/0028297 A1 | 2/2003 | Iihoshi |
| 2005/0184155 A1 | 8/2005 | Pinkus |
| 2005/0192832 A1 | 9/2005 | Call |
| 2006/0004485 A1 | 1/2006 | Thomas |
| 2006/0012479 A1 | 1/2006 | Ezra |
| 2008/0195432 A1 | 8/2008 | Fell |
| 2008/0201213 A1 | 8/2008 | Lee |
| 2008/0277466 A1 | 11/2008 | Dohm |
| 2010/0308965 A1 | 12/2010 | Weitzhandler |
| 2011/0035049 A1 | 2/2011 | Barrett |
| 2012/0303531 A1 | 11/2012 | Betancourt |
| 2013/0006776 A1 | 1/2013 | Miller |
| 2013/0006860 A1 | 1/2013 | Balasubramanian |
| 2013/0013431 A1 | 1/2013 | Fansler |
| 2014/0052613 A1 | 2/2014 | Tavakoli |
| 2014/0172157 A1 | 6/2014 | Bellamy, III |
| 2014/0172690 A1 | 6/2014 | Duke |
| 2014/0279535 A1 | 9/2014 | Fadler |
| 2015/0026047 A1 | 1/2015 | Johnson, Jr. |
| 2015/0088738 A1 | 3/2015 | Cateland |
| 2015/0106196 A1 | 4/2015 | Williams |
| 2015/0120474 A1 | 4/2015 | Webb |
| 2015/0134455 A1 | 5/2015 | Gorpynich |
| 2015/0161590 A1 | 6/2015 | Genovez |
| 2015/0242855 A1 | 8/2015 | Vilnai |
| 2016/0035001 A1 | 2/2016 | Driscoll |
| 2016/0035013 A1 | 2/2016 | Plattenburg |
| 2016/0086163 A1 | 3/2016 | Hosny |
| 2016/0232565 A1 | 8/2016 | Goergen |
| 2017/0032475 A1 | 2/2017 | Chawla |
| 2017/0069152 A1 | 3/2017 | Mcquade |
| 2017/0076274 A1 | 3/2017 | Royyuru |
| 2017/0161716 A1 | 6/2017 | Hurley |
| 2017/0178257 A1 | 6/2017 | Tingler |
| 2017/0180012 A1 | 6/2017 | Tingler |
| 2017/0243410 A1 | 8/2017 | Caballero |
| 2017/0278088 A1 | 9/2017 | Vixamar |
| 2017/0308964 A1 | 10/2017 | Morris |
| 2017/0352020 A1 * | 12/2017 | Jaeger ............ H04W 4/023 |
| 2019/0389718 A1 | 12/2019 | Patil |

OTHER PUBLICATIONS

PCT; App. No. PCT/US2016/066795; International Search Report and Written Opinion dated Mar. 3, 2017; pp. 1-10.

PCT; App. No. PCT/US2016/066795; International Search Report and Written Opinion dated Mar. 13, 2017; pp. 1-10.

PCT; App. No. PCT/US2016/066909; International Search Report and Written Opinion dated Feb. 28, 2017; pp. 1-11.

PCT; App. No. PCT/US2019/037434; International Search Report and Written Opinion; dated Aug. 28, 2019.

U.S. Appl. No. 15/381,048; Advisory Action dated Apr. 9, 2020; (pp. 1-3).

U.S. Appl. No. 15/381,048; Office Action dated Feb. 25, 2019; (pp. 1-12).

U.S. Appl. No. 15/381,048; Office Action dated Jun. 13, 2019; (pp. 1-12).

U.S. Appl. No. 15/381,048; Office Action dated Oct. 17, 2018; (pp. 1-12).

U.S. Appl. No. 15/381,048; Office Action dated Dec. 30, 2019; (pp. 1-12).

U.S. Appl. No. 16/295,855; Notice of Allowance dated Feb. 11, 2020; (pp. 1-9).

U.S. Appl. No. 16/295,855; Office Action dated Nov. 15, 2019; (pp. 1-10).

* cited by examiner

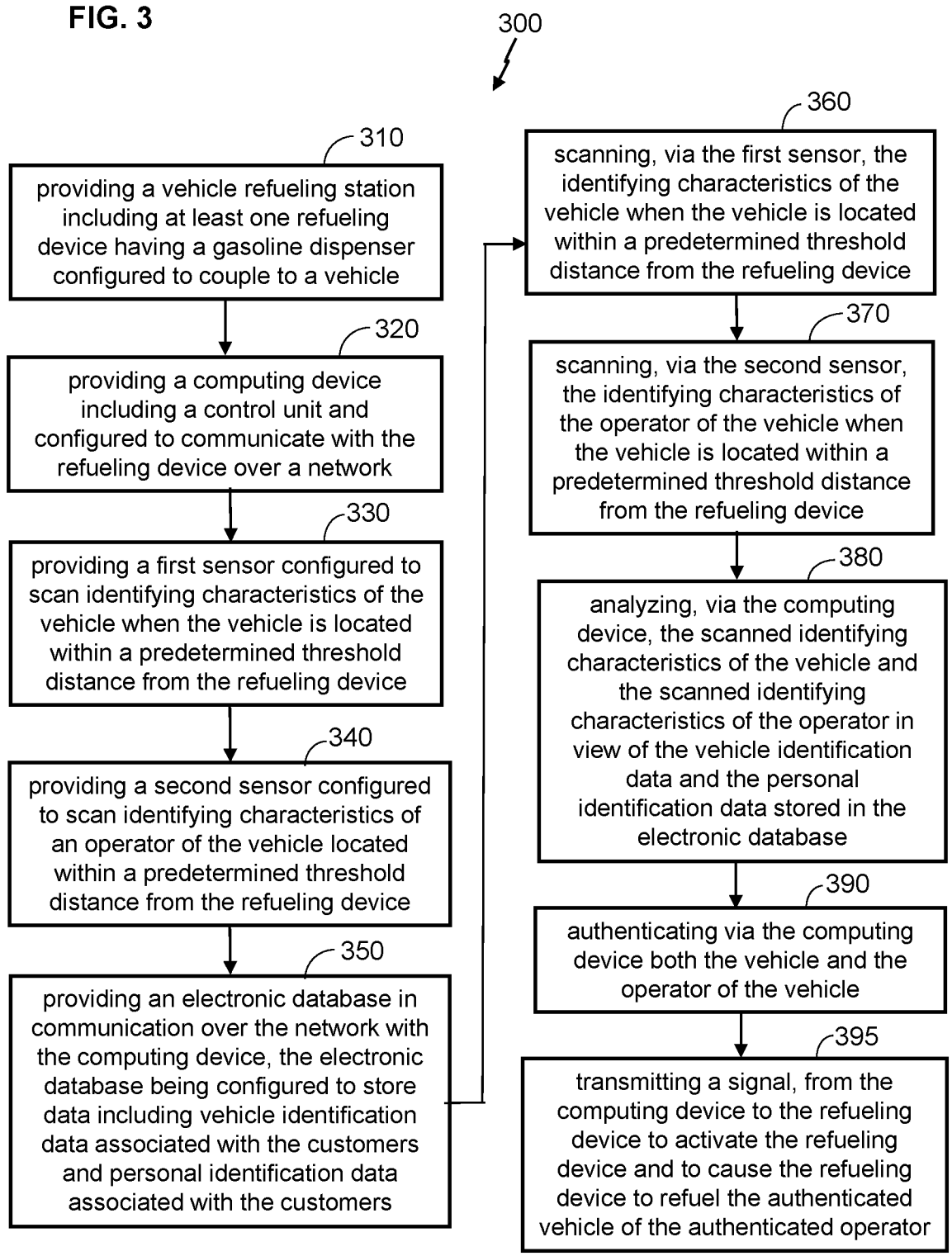

SYSTEMS AND METHODS FOR AUTOMATICALLY REFUELING VEHICLES OF CUSTOMERS OF A RETAILER

CROSS-REFERENCE TO RELATED APPLICATIONS

This application is a continuation of U.S. application Ser. No. 16/295,855, filed Mar. 7, 2019, which claims the benefit of U.S. Provisional Application No. 62/687,439, filed Jun. 20, 2018, each of which is incorporated herein by reference in its entirety.

TECHNICAL FIELD

This invention relates generally to vehicle refueling stations and, in particular, to refueling stations that automatically refuel vehicles of customers of a retailer.

BACKGROUND

Gas station customers typically fill up their cars with gasoline at gas stations having automated gas pumps by having to get out of their car, sliding their credit card into a slot provided in or near the gas pumps, then selecting the desired grade of gasoline to be dispensed by the pumps, and inserting the dispenser nozzle of the gas pump into the gas tank opening of their car. Having to exit one's vehicle to refuel the vehicle with gasoline is not only a time-consuming inconvenience, but may also be undesirable depending on the neighborhood the gas station is in, the time of day (e.g., night), and the presence of inclement weather elements.

BRIEF DESCRIPTION OF THE DRAWINGS

Disclosed herein are embodiments of systems, apparatuses, methods, and systems pertaining to automatically refueling vehicles of authenticated customers of a retailer. This description includes drawings, wherein:

FIG. 3 is a flow chart diagram of a process of automatically refueling vehicles of authenticated customers of a retailer in accordance with some embodiments.

Figure 1:
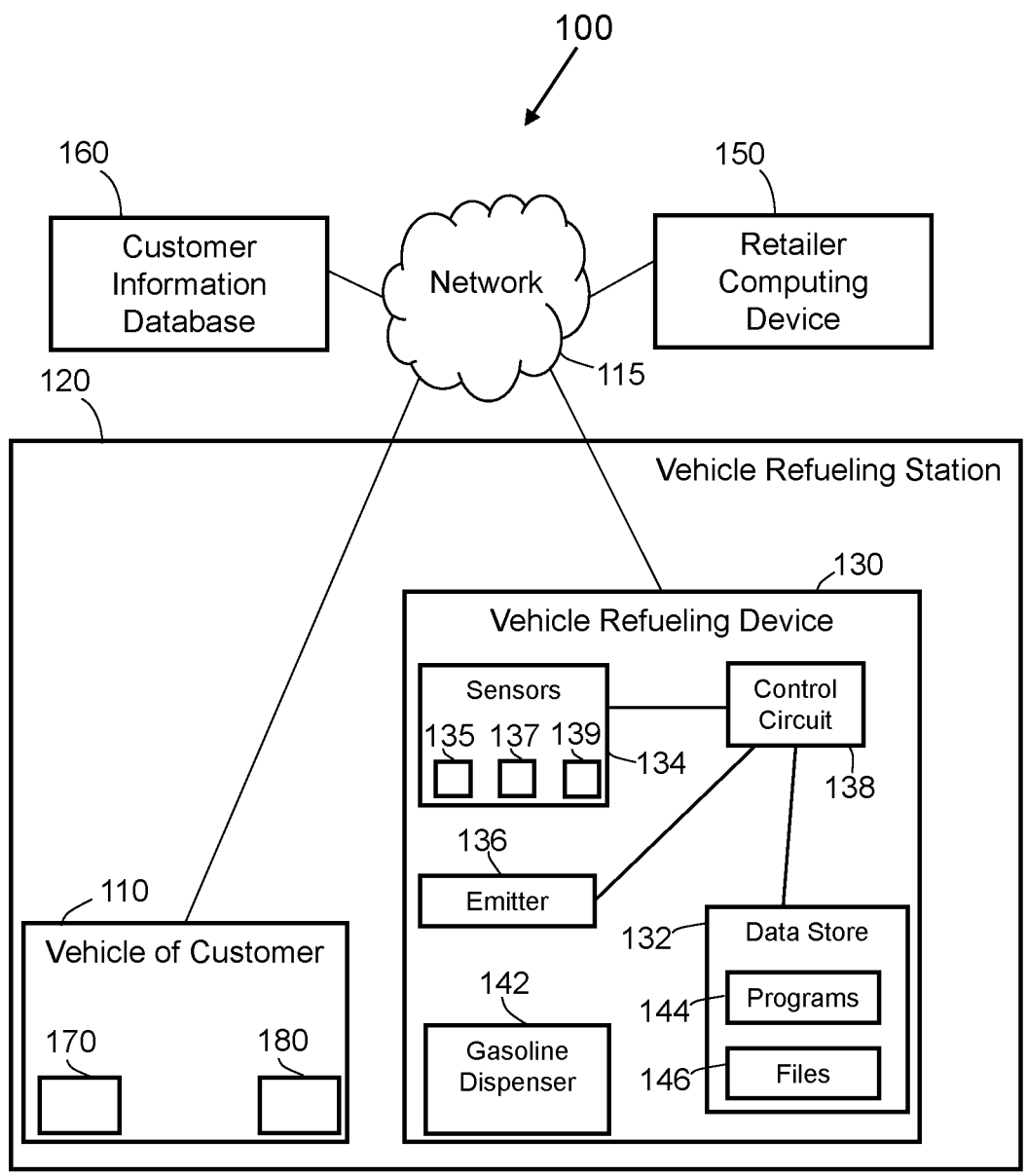
FIG. 1 is a diagram of a system for automatically refueling vehicles of authenticated customers of a retailer in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for automatically refueling vehicles of authenticated customers of a retailer.

In some embodiments, a system of automatically refueling vehicles of authenticated customers of a retailer comprises a vehicle refueling station including at least one refueling device having a gasoline dispenser configured to couple to a vehicle and refuel the vehicle with gasoline; a computing device including a processor-based control unit and configured to communicate with the at least one refueling device over a network; a first sensor configured to scan identifying characteristics of the vehicle when the vehicle is located within a predetermined threshold distance from the refueling device, the first sensor being in communication with the computing device over the network; a second sensor configured to scan identifying characteristics of an operator of the vehicle located within a predetermined threshold distance from the refueling device, the second sensor being in communication with the computing device over the network; and an electronic database in communication over the network with the computing device. The electronic database is configured to store data including: vehicle identification data associated with the customers of the retailer authorized to refuel at the vehicle refueling station; and personal identification data associated with the customers of the retailer authorized to refuel at the vehicle refueling station. The control unit of the computing device is configured to: analyze the identifying characteristics of the vehicle scanned by the first sensor and the identifying characteristics of the operator scanned by the second sensor in view of the vehicle identification data and the personal identification data stored in the electronic database to determine whether the scanned identifying characteristics of the vehicle and the scanned identifying characteristics of the operator of the vehicle correspond to the vehicle identification data and the personal identification data stored in the electronic database in association with a customer of the retailer authorized to refuel at the vehicle refueling station; and in response to a determination, by the control unit, that scanned identifying characteristics of the vehicle and the scanned identifying characteristics of the operator obtained during the scanning steps correspond to the vehicle identification data and the personal identification data stored in the electronic database in association with the customer of the retailer authorized to refuel at the vehicle refueling station, to: authenticate both the vehicle and the operator of the vehicle; and transmit a signal to the refueling device to activate the refueling device and to cause the refueling device to refuel the authenticated vehicle of the authenticated operator.

In other embodiments, a method of automatically refueling vehicles of authenticated customers of a retailer comprises: providing a vehicle refueling station including at least one refueling device having a gasoline dispenser configured to couple to a vehicle and refuel the vehicle with gasoline; providing a computing device including a processor-based control unit and configured to communicate with the at least one refueling device over a network; providing a first sensor configured to scan identifying characteristics of the vehicle when the vehicle is located within a predetermined threshold distance from the refueling device, the first sensor being in communication with the computing device over the network; providing a second sensor configured to scan identifying characteristics of an operator of the vehicle located within a predetermined threshold distance from the refueling device, the second sensor being in communication with the computing device over the network; providing an electronic database in communication over the network with the computing device. The electronic database is configured to store data including: vehicle identification data associated with the customers of the retailer authorized to refuel at the vehicle refueling station; and personal identification data associated with the customers of the retailer authorized to refuel at the vehicle refueling station. The method further includes: scanning, via the first sensor, the identifying characteristics of the vehicle when the vehicle is located within a predetermined threshold distance from the refueling device; scanning, via the second sensor, the identifying characteristics of the operator of the vehicle when the vehicle is located within a predetermined threshold distance from the refueling device; analyzing, via the computing device, the scanned identifying characteristics of the vehicle and the scanned identifying characteristics of the operator in view of the vehicle identification data and the personal identification data stored in the electronic database, to determine whether the scanned identifying characteristics of the vehicle and the scanned identifying characteristics of the operator of the vehicle correspond to the vehicle identification data and the personal identification data stored in the electronic database in association with a customer of the retailer authorized to refuel at the vehicle refueling station. The method includes, in response to a determination by the computing device that scanned identifying characteristics of the vehicle and the scanned identifying characteristics of the operator obtained during the scanning steps match the vehicle identification data and personal identification data stored in the electronic database in association with the customer of the retailer authorized to refuel at the vehicle refueling station: authenticating via the computing device both the vehicle and the operator of the vehicle; and transmitting a signal, from the computing device to the refueling device to activate the refueling device and to cause the refueling device to refuel the authenticated vehicle of the authenticated operator.

FIG. 1 shows an embodiment of a system 100 automatically refueling vehicles 110 of authenticated customers of a retailer at a gas refueling station 120 of the retailer. It will be understood that the details of this example are intended to serve in an illustrative capacity and are not necessarily intended to suggest any limitations in regards to the present teachings. The retailer may be any entity the provides gasoline refueling services to customers. A customer may be an individual or business entity. The exemplary system 100 depicted in FIG. 1 includes a vehicle refueling station 120 including at least one vehicle refueling device 130 having a gasoline dispenser 142 configured to couple to a vehicle 110 and refuel the vehicle 110 with gasoline. The system 100 further includes a retailer computing device 150 that includes a processor-based control unit and is configured to communicate with the refueling device 130 over a network 115.

The retailer computing device 150 may be a stationary or portable electronic device, for example, a desktop computer, a laptop computer, a tablet, a mobile phone, or any other electronic device including a processor-based control circuit (i.e., control unit). For purposes of this specification, the term "retailer computing device" will be understood to refer to a computing device owned by the retailer or any computing device owned and/or operated by an entity (e.g., $3^{rd}$ party contractor) having an obligation to provide refueling services on behalf of the retailer to customers of the retailer.

In the embodiment of FIG. 1, the retailer computing device 150 is configured for data entry and processing as well as for communication with other devices of system 100 via the network 115. In some embodiments, as will be described below, the retailer computing device 150 is configured to access an electronic customer information database 160 via the network 115 to facilitate automatic refueling of the vehicle 110 of an authenticated customer of the retailer. In the exemplary system 100 of FIG. 1, the retailer computing device 150 is in two-way communication with the refueling device 130 over the network 115.

For example, in some embodiments, the retailer computing device 150 is configured to authenticate the vehicle 110 and the operator of the vehicle 110 by sending a signal over the network 115 to query the electronic database 160 and obtain, from the electronic database 160 both the membership status and the payment information associated with the operator in the electronic database 160. In some aspects, after the retailer computing device 150 determines that the membership status of the operator of the vehicle 110 is valid and that the payment information of the operator is valid, the retailer computing device 150 is configured to transmit a signal over the network 115 to the refueling device 130 to activate the refueling device 130.

In other exemplary embodiments, the retailer computing device 150 is configured to transmit a query (e.g., a signal) to the electronic database 160 over the network 115 to obtain, from the electronic database 160, gasoline grade preferences predefined by the vehicle operator (i.e., registered customer of the retailer), as well as the gasoline grade price stored in the electronic database 160 in association with a membership status of the operator of the vehicle 110. In some aspects, the retailer computing device 150 is also configured to transmit a signal over the network 115 to the refueling device 130 to activate the refueling device to dispense (i.e., via the gasoline dispenser 142) the gasoline grade predefined by the operator at the grade price associated in the electronic database 160 with the membership status of the operator.

In yet another example, the retailer computing device 150 is configured to receive, over the network 115 from the refueling device 130, a signal indicating an amount of gasoline dispensed by the refueling device 130 into the vehicle 110, as well as an amount of money to be charged for the amount of gasoline dispensed by the refueling device 130 into the vehicle 110. In some aspects, the retailer computing device 150 is configured to transmit a signal to the electronic database 160 over the network 115 to debit a payment method of the operator of the vehicle 110 stored in the electronic database 160 for the amount of money indicated in the signal received by the retailer computing device 150 from the refueling device 130. In other aspects, the retailer computing device 150 generates a reward credit for the operator of the vehicle 110 for the money spent by the operator during refueling of the vehicle 110 and transmits a signal to the electronic database 160 over the network 115 to store the generated reward credit in the electronic database 160 in association with the data associated with the operator of the vehicle 110.

The network 115 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the system 100 includes a customer information database 160. In some embodiments, the customer information database 160 may be configured to store information associated with customers of the retailer who are signed up to refuel their vehicles 110 at one or more gas refueling station 120 of the retailer. In some aspects, the customer information database 160 may store electronic information including but not limited to: personal information of each customer of the retailer signed up for the gas refueling services provided by the retailer, for example, customer's name, customer's address, identifying characteristics of the customer (e.g. photograph or biometric facial scan, fingerprint scan, etc.), vehicle identification data (e.g., license plate, make and model, color, year, V2X identifier, RFID transponder/digital card or key, Apple Carplay, Android Auto, Wi-Fi hotspot, etc.) of one or more vehicles 110 owned by the customer or a user (e.g., family member, friend, employee, etc.) authorized by the customer, customer's selected payment method information, customer's order history, customer-selected gasoline grade, customer's membership number, customer's membership reward status.

The customer information database 160 may be stored, for example, on non-volatile storage media (e.g., a hard drive, flash drive, or removable optical disk) internal or external to the retailer computing device 150, or internal or external to computing devices separate and distinct from the retailer computing device 150. It will be appreciated that the customer information database 160 may likewise be cloud-based. While the retailer computing device 150 is illustrated in FIG. 1 as being in communication with only one electronic database (i.e., customer information database 160), it will be appreciated that the system 100 may be implemented such that the system includes two or more separate databases.

In some embodiments, when a customer of the retailer initially sets up an online account with the retailer (e.g., by using a personal electronic device 180 of the user to sign into a website or online server operated by or for the retailer), the system 100 is configured to permit the customer to generate a profile including personal information of the customer (e.g., name, address, phone number, and the like), identifying characteristics of the customer (e.g. photograph or biometric facial scan, fingerprint scan, etc.), vehicle identification data (e.g., license plate, make and model, color, year, V2X identifier, RFID transponder/digital card or key, Apple Carplay, Android Auto, Wi-Fi hotspot, etc.) of one or more vehicles 110 owned by the customer (or a user authorized by the customer), customer's selected payment method (e.g., credit card information), gasoline grade preferred by the customer, or the like.

In some embodiments, for example, during the process of signing of for a gas refueling accounting with the retailer using the personal electronic device 180, the customer can specify a grade of gasoline to be pumped into the vehicle 110 of the customer at the refueling station 120. It will be appreciated that the customer may select new options and/or update previously selected options at any time after setting up the account with the retailer. In some embodiments, the personal identification data of the customer and any vehicle identification data provide by the customer are stored in the customer information database 160 for subsequent retrieval by the retailer computing device 150 or another computer/server of the system 100 in communication with the retailer computing device 150 (e.g., in response to a login request by the customer, or an attempt to refuel a vehicle 110 by the customer).

In some embodiments, the customer is permitted to communicate with the retailer computing device 150 via the personal electronic device 180 of the customer, which may be a stationary, portable, and/or hand-held electronic device, for example, a desktop computer, a laptop computer, a tablet, a mobile phone, or any other electronic, processor-based device that may be configured for data entry and communication with the retailer computing device 150 over the network 115. In some embodiments, the personal electronic device 180 of the customer may include an installed retailer-associated mobile application (app) configured to display various menu options, notifications, and/or alerts for the customer in association with the customer refueling his/her vehicle 110 at the refueling station 120.

With reference to FIG. 1, the system 100 further includes a vehicle refueling device 130. While FIG. 1 illustrates the refueling station 120 as only including one vehicle refueling device 130, it will be appreciated that the gas refueling station 120 may include two or more vehicle refueling devices 130, for example, 4, 6, 8, 10, 12, 14, 16, 18, 20, etc. The exemplary vehicle refueling device 130 of FIG. 1 includes one or more data stores 132, sensors 134, and emitter 136, and a gasoline dispenser 142 each in communication with the control circuit 138. In some aspects, the gasoline dispenser 142 may include a hose and a nozzle that may be movable (e.g., by a robotic arm) such that a nozzle of the gasoline dispenser 142 is inserted into the gas tank opening. The gasoline dispenser 142 configured to be activated by the control circuit 138 as described in more detail below in order to refuel the vehicle 110 of a customer of the retailer.

In some embodiments, the vehicle refueling device 130 of the system 100 does not require physical operation by a human operator and wirelessly communicates with, and is wholly or largely controlled by, the retailer computing device 150. For example, the retailer computing device 150 may control actions of the vehicle refueling device 130 in order to refuel the vehicle 110 of a customer via the gasoline dispenser 142 by transmitting wireless signals over the network 115 to the vehicle refueling device 130. In some approaches, the control circuit 138 of the vehicle refueling device 130 is programmed to cause the gasoline dispenser 142 to refuel the vehicle 110 of the customer without receiving remote control signals from the retailer computing device 150.

In some embodiments, the emitter 136 of the vehicle refueling device 130 is configured as a two-way transceiver configured to receive signals from and/or signals to the retailer computing device 150 and/or the vehicle 110 of the customer. For example, in some aspects, the emitter 136 may be configured to transmit the vehicle identification data scanned by the first sensor 135 to the electronic database 160 for storage. In some aspects, the emitter 136 may be configured to transmit the vehicle identification data scanned by the first sensor 135 from the vehicle 110 to the retailer computing device 150 to facilitate the retailer computing device 150 to query the electronic database 160 and determine whether the scanned vehicle identification data scanned by the first sensor 135 matches the vehicle identification data stored in the electronic database 160 in association with customers of the retailer authorized to refuel at the vehicle refueling station 120. In other aspects, the emitter 136 may be configured to transmit the personal identification data scanned by the second sensor 137 to the retailer computing device 150 to facilitate the retailer computing device 150 to query the electronic database 160 and determine whether the personal identification data of the operator of the vehicle 110 scanned by the first sensor 135 matches the personal identification data stored in the electronic database 160 in association with customers of the retailer authorized to refuel at the vehicle refueling station 120.

In some embodiments, the emitter 136 of the vehicle refueling device 130 is configured to transmit, via the network 115, a signal (e.g., to the retailer computing device 150, personal electronic device 180, customer information database 160, etc.) including an electronic confirmation that the vehicle refueling device 130 has successfully filled up the vehicle 110 of the customer with gasoline. In some aspects, such an electronic confirmation includes an electronic receipt indicating the amount of gasoline dispensed, the total price, the customer's name and/or membership number, the number of reward points earned as a result of the fill up, and the like. In certain aspects, such an electronic confirmation may be transmitted by the emitter 136 to the personal electronic device 180 of the customer by short message service (SMS) and/or e-mail.

In some configurations, the emitter 136 of the vehicle refueling device 130 is configured to receive, via the network 115, one or more signals from the vehicle 110 of the customer including vehicle identification data of the vehicle 110 scanned by the first sensor 135 and/or personal identification data of the operator of the vehicle 110 scanned by the second sensor 137. In other aspects, the emitter 136 of the vehicle refueling device 130 is configured to receive, via the network 115 and from the retailer computing device 150, one or more signals that include an electronic confirmation that the vehicle 110 and the operator of the vehicle have been authenticated and/or one or more signals that cause the control circuit 138 to activate the gasoline dispenser 142 and fill up the vehicle 110 of the authenticated operator with gasoline.

The exemplary vehicle refueling device 130 further includes one or more sensors 134. The sensors 134 can include substantially any relevant devices that provide information to the vehicle refueling device 130 to be used in refueling the vehicle 110 with gasoline. In some embodiments, the vehicle refueling device 130 may include sensors 134 including one or more devices that can be used to capture data related to one or more objects (e.g., vehicle 110, operator of the vehicle 110, etc.) located within a threshold distance relative to the vehicle refueling device 130. In some embodiments, one or more sensors 134 of the vehicle refueling device 130 include, but are not limited to, one or more sensors configured to detect movement, one or more distance measurement sensors, one or more sensors capture images and/or video, one or more microphones (e.g., which can be configured to capture audible authentication codes and/or voice prints, verbal input from customers, verbal inquiries from customers, etc.), one or more biometric (facial scan, fingerprint, etc.) sensors, or a combination of such sensors.

In some embodiments, to facilitate the identification of the vehicle 110 of the customer arriving at the refueling station 120, the sensors 134 of the vehicle refueling device 130 include a first sensor 135, which is configured to scan identifying characteristics of the vehicle 110. In some embodiments, the first sensor 135 is configured scan a combination of letters and numbers on a license plate of the vehicle 110. In such embodiments, the first sensor 135 may be implemented as a digital camera (configured to obtain video and/or photo images of the vehicle 110). In some embodiments, the first sensor 135 is configured to scan the identifying characteristics of the vehicle 110 by receiving vehicle-identifying signals (e.g., vehicle-to-vehicle (V2V) signals, vehicle-to-infrastructure (V2X) signals, or the like) from one or more transmitter devices 170 integrally incorporated into or simply present in the vehicle 110, and configured to transmit, when scanned by the first sensor 135, wireless signals uniquely identifying the vehicle 110. Examples of such transmitter devices 170 may include, but are not limited to V2V device, V2X device, Wifi hotspot, Apple CarPlay, Android Auto, or the like.

In certain aspects, the first sensor 135 is configured to scan the identifying characteristics of the vehicle 110 when the vehicle 110 is located within a predetermined threshold distance from the refueling device 130. The predetermined distance may be from about 1 foot to about 50 feet, for example, 2 feet, 3 feet, 4 feet, 5 feet, 6 feet, 10 feet, 15 feet, 20 feet, etc. In some embodiments, the first sensor 135 is configured for communication with the retailer computing device 150 and/or the electronic database 160 over the network 115, such that the first sensor 135 may transmit the identifying characteristics of the vehicle 110 scanned by the first sensor 135 over the network 115 to the retailer computing device 150 and/or electronic database 160. For example, in some aspects, the first sensor 135 is configured to transmit, via the emitter 136, sensor data including the combination of letters and/or numbers detected by the sensor 136 on the license plate of the vehicle 110 to the retailer computing device 150, enabling the retailer computing device 150 to authenticate the vehicle 110 based on the received sensor data. In some implementations, the vehicle refueling device 130 does not depend on the retailer computing device 150 to authenticate the vehicle 110 and the first sensor 135 is configured to transmit the sensor data including the combination of letters and/or numbers detected by the sensor 136 on the license plate of the vehicle 110 to the control circuit 138 of the vehicle refueling device 130, enabling the control circuit 138 to authenticate the vehicle 110 based on the received sensor data.

In some embodiments, to facilitate the identification of the operator of the vehicle 110 arriving at the refueling station 120, the sensors 134 of the vehicle refueling device 130 include a second sensor 137 configured to scan the identifying characteristics of an operator of the vehicle 110. For example, the second sensor 137 may be configured to scan identifying characteristics such as physical attributes of the operator including but not limited to a face of the operator of the vehicle 110, a fingerprint of the operator of the vehicle 110, or the like. In some aspects, the second sensor 137 may be configured to scan identifying characteristics not limited to physical attributes of the operator, but including personal electronic devices 180 associated with the operator of the vehicle 110 and configured to transmit a signal that uniquely identifies the personal electronic device 180 of the operator of the vehicle 110. One advantage of the ability of the second sensor 137 to identify the actual operator of the vehicle includes preventing a person who is not a registered customer of the retailer from obtaining gasoline from the refueling station 120 even when such a person is operating the vehicle 110 known to the system 100 to be associated with an authorized customer.

In certain aspects, the second sensor 137 is configured to scan the identifying characteristics of the operator of the vehicle 110 when the vehicle 110 is located within a predetermined threshold distance from the refueling device 130. The predetermined distance may be from about 1 foot to about 50 feet, for example, 2 feet, 3 feet, 4 feet, 5 feet, 6 feet, 10 feet, 15 feet, 20 feet, etc. In certain aspects, the second sensor 137 is configured to detect a wireless signal (including an identifier unique to a retailer-associated mobile application (app) installed on the personal electronic device 180) from the personal electronic device 180 of the operator of the vehicle 110 in order to facilitate an identification of the operator of the vehicle 110. In some aspects, the second sensor 137 is configured to communicate with the retailer computing device 150 and/or electronic database 160 over the network 115, such that the second sensor 137 may transmit the identifying characteristics of the operator of the vehicle 110 scanned by the second sensor 137 to the retailer computing device 150 and/or electronic database 160.

In some embodiments, instead of the first sensor 135 and the second sensor 137 being continuously activated and drawing electrical power, the sensors 314 of the vehicle refueling device 130 include a third sensor 139 configured to detect a presence of the vehicle 110 when the vehicle 110 is located within a predetermined threshold distance from the refueling device 130. The predetermined distance may be from about 1 foot to about 50 feet, for example, 2 feet, 3 feet, 4 feet, 5 feet, 6 feet, 10 feet, 15 feet, 20 feet, etc. In some aspects, the first sensor 135 and the second sensor 137 are in a low-power or off state until the third sensor 139 detects the presence of the vehicle 110 at the refueling station 120 and within a predetermined threshold distance from the refueling device 130, and causes the first sensor 135 and the second sensor 137 to be activated (e.g., directly by the third sensor 139, or by the third sensor 139 via the control circuit 138).

In some embodiments, the emitter 136 of the vehicle refueling device 130 is a wired or a wireless transceiver configured to convey information, notifications, and/or warnings to a customer (e.g., operator of the vehicle 110) and/or a worker at the vehicle refueling station 120 and/or a worker of the retailer in a location remote to the vehicle refueling station 120. In some aspects, the emitter 116 comprises one or more output devices (e.g., speakers, displays, lights, etc.) that convey text, audio, and/or visual signals. Similarly, the emitter 116 may additionally or alternatively be configured to facilitate wireless data communications with a computing device, including but not limited to, retailer computing device 150.

In some embodiments, one or more data stores 132 of the vehicle refueling device 130 provide an information repository that stores programs 144 and files 146. The vehicle refueling device 130 may, in some embodiments, further access one or more programs 144, files 146, and/or other relevant information external to the vehicle refueling device 130 and accessible via the network 115. The files 146 can include information transmitted by the retailer computing device 150, data captured by the sensors 134 (e.g., vehicle identification data, personal identification data, etc.) customer information and preferences, gasoline price information, historical customer order information, and/or other such information. In some aspects, the files 146 can further include one or more salutations and/or advertisements that may be displayed to the customer while the vehicle refueling device 130 is refueling the vehicle 110. In some embodiments, the vehicle refueling device 130 may be configured such that the advertisements are personalized using the customer's specific information to increase the interest of the customer.

In the illustrated embodiment, the vehicle refueling device 130 includes programs 146 that are stored in the data store 132 and/or other memory, and utilized at least by the control circuit 138. In some applications, one or more of the programs 146 represents software executed by the control circuit 138 to facilitate the operation, control, commercial activity, interaction with customers, and the like for the vehicle refueling device 130. For example, in some aspects, the control circuit 118, in executing one or more programs 144, can: use the data acquired and/or generated by the sensors 134 to detect when vehicles 110 and/or customers are located within a threshold distance relative to the vehicle refueling device 130; generate notifications in response to detecting the presence of the vehicles 110 and/or customers; generate notifications in response to receiving control signals from the retailer computing device 150; and generate notifications in response to completing the fill up of the vehicle 110 of the customer with gasoline. In some embodiments, the control circuit 138, in executing one or more programs 146, can generate one or more types of biometric data (facial scan, fingerprint scan, etc.) using information captured via the sensors 134, and determine whether the generated biometric data has one or more threshold relationships to predetermined biometric data included in files 146, such that the generated biometric data having threshold relationships identify the operators of the vehicles 110 as authorized customers of the retailer, and such that the data lacking the threshold relationships identify unknown/unauthorized operators.

Figure 2:
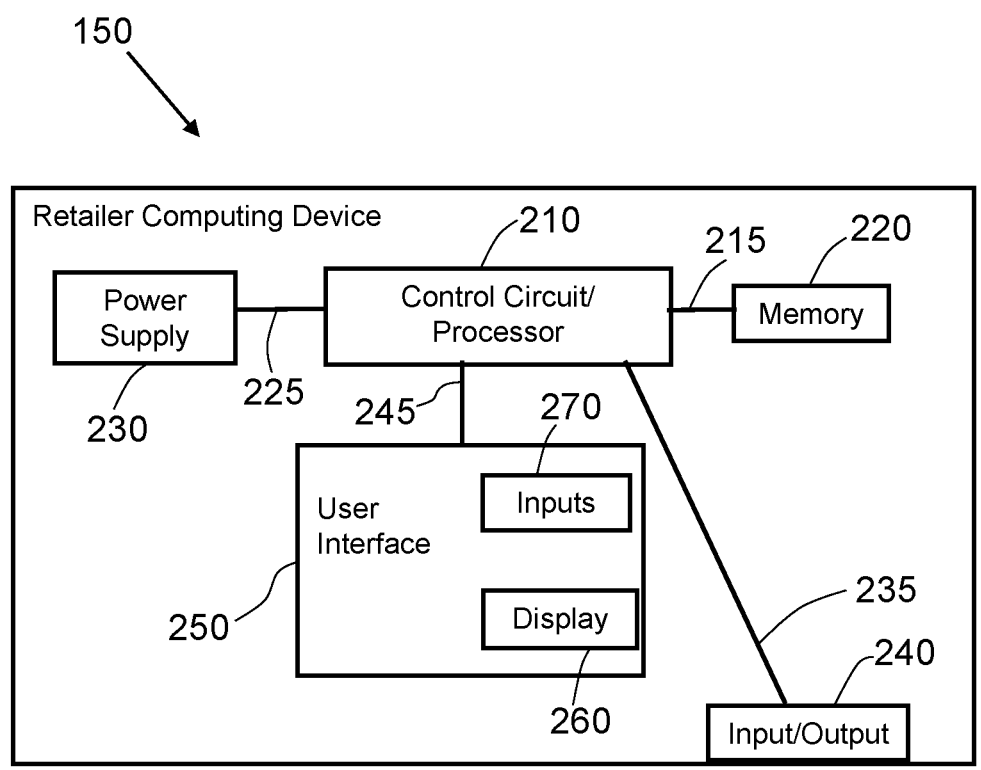
FIG. 2 is a functional diagram of an exemplary retailer computing device usable with the system of FIG. 1 in accordance with some embodiments.

With reference to FIG. 2, an exemplary retailer computing device 150 configured for use with the systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control unit may be referred to as a non-transitory medium or non-transitory computer readable medium.

The control unit 210 of the retailer computing device 150 is also electrically coupled via a connection 235 to an input/output 240 that can receive signals from the vehicle refueling device 130 and/or from the customer information database 160, or from any other source (e.g., personal electronic device 180) that can communicate with the retailer computing device 150 via a wired or wireless connection. The input/output 240 of the retailer computing device 150 can also send signals to the vehicle refueling device 130 (e.g., control signal confirming authentication of the vehicle 110 and the operator of the vehicle 110 as an authorized customer of the retailer), or to any other device (e.g., customer information database 160, personal electronic device 180, etc.) in wired or wireless communication with the retailer computing device 150.

In the embodiment shown in FIG. 2, the processor-based control unit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to send control signals to the vehicle refueling device 130 and/or communicate with the operator of the vehicle 110 located at the vehicle refueling station 120. It will be appreciated that the performance of such functions by the processor-based control unit 210 of the retailer computing device 150 is not dependent on a human operator, and that the control unit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the new customer sign-up and/or actual fill up by the customer at the vehicle refueling station 120. The inputs 270 of the retailer computing device 150 may be configured to permit an operator to navigate through the on-screen menus on the retailer computing device 150 and make changes and/or updates to various aspects of the account of the customer (e.g., update the reward points in response to an amount spent for gasoline fill up). It will be appreciated that the display screen 260 may be configured as both a display screen and an input 270 (e.g., a touch-screen that permits an operator to press on the display screen 260 to enter text and/or execute commands.)

In some aspects, after the retailer computing device 150 receives the identifying characteristics of the vehicle 110 and the identifying characteristics of the operator of the vehicle 110 scanned by the first sensor 135 and the second sensor 137, respectively, of the vehicle refueling device 130, the control circuit 210 of the retailer computing device 150 is programmed to transmit a signal over the network 115 to query the electronic database 160 and obtain the vehicle identification data and the personal identification data stored in the electronic database 160 in association with customers of the retailer authorized to refuel at the vehicle refueling station 120 in order to determine whether there is a match between the scanned data and the stored authentication data. In one aspect, the control circuit 210 is programmed to analyze the identifying characteristics of the vehicle 110 scanned by the first sensor 135 and the identifying characteristics of the operator of the vehicle 110 scanned by the second sensor 137 in view of the vehicle identification data and personal identification data stored in the electronic database 160.

The above analysis enables the control circuit 210 to determine whether the scanned identifying characteristics of the vehicle 110 and the scanned identifying characteristics of the operator of the vehicle 110 correspond to the vehicle identification data and the personal identification data stored in the electronic database 160 in association with a customer of the retailer authorized to refuel at the vehicle refueling station 120. In one aspect, after the control unit 210 determines that both scanned identifying characteristics of the vehicle 110 and the scanned identifying characteristics of the operator obtained by the first and second sensors 135 and 137 correspond to the vehicle identification data and the personal identification data stored in the electronic database 160 in association with an authorized customer of the retailer, the control unit 210 authenticates both the vehicle 110 and the operator of the vehicle 110. The control unit 210 then transmits a signal to the refueling device 130, thereby activating the refueling device 130 and causing the refueling device 130 to refuel the authenticated vehicle 110 of the authenticated operator. In some aspects, after the control unit 210 determines that both the scanned identifying characteristics of the vehicle 110 and the scanned identifying characteristics of the operator obtained by the first and second sensors 135 and 137 match the vehicle identification data and the personal identification data stored in the electronic database 160 in association with an authorized customer of the retailer, the control unit 210 transmits a control signal to the refueling device 130, thereby causing the control circuit 138 of the refueling device 130 to activate the gasoline dispenser 142, which then refuels the authenticated vehicle 110 of the authenticated operator.

In some embodiments, the control circuit 210 of the retailer computing device 150 is programmed to generate customer alerts/notification in connection with the customer's actions at the refueling station 120. The customer alerts may be generated by the retailer computing device 150 based on information received from the vehicle refueling device 130. In some aspects, the customer alerts may be transmitted from the retailer computing device 150 via the network 115 to the personal electronic device 180 of the customer. For example, the retailer computing device 150 may transmit a signal over the network 115 to the personal electronic device 180 including a notification including a receipt for the customer's gasoline fill up at the refueling station 120, or an alert indicating that the vehicle refueling device 130 was unable to successfully refuel the vehicle 110. In some embodiments, customer alerts sent to the personal electronic device 180 of the customer may include but are not limited to short message service (SMS) messages, electronic mail (e-mail) messages, instant messenger messages, and/or push notifications (to a mobile app on the personal electronic device 180 of the customer).

In some aspects, the control circuit 210 of the retailer computing device 150 is programmed to assign reward points to the account of the customer after the customer has filled up his/her vehicle 110 at the vehicle refueling station 120. For example, in one aspect, after the sale of gasoline to the customer is complete, the control circuit 210 is programmed to transmit an electronic notification to the electronic database 160 instructing the electronic database 160 to update (i.e., increase) the number of reward points associated in the electronic database 160 with the account of the customer by an amount appropriate (e.g., one point per one dollar, two points per one dollar, three points per one dollar, etc.) for the amount of money spent by the customer on filling up his/her vehicle at the refueling station 120.

FIG. 3 shows an embodiment of an exemplary method 300 of automatically refueling vehicles 110 of authenticated customers of a retailer. The embodiment of the method 300 illustrated in FIG. 3 includes providing a vehicle refueling station 120 including at least one refueling device 130 having a gasoline dispenser 142 configured to couple to a vehicle 110 and refuel the vehicle with gasoline (step 310). The illustrated method 300 also includes providing a retailer computing device 150 including a processor-based control unit 210 and configured to communicate with the refueling device 130 over a network 115 (step 320).

As discussed above, in some embodiments, the refueling device 130 is configured to identify both the vehicle 110 and the operator of the vehicle 110 that enter the vehicle refueling station 120. To that end, the illustrated method 300 includes providing a first sensor 135 configured to scan identifying characteristics of the vehicle 110 when the vehicle 110 is located within a predetermined threshold distance from the refueling device 130 (step 330) and providing a second sensor 137 configured to scan identifying characteristics of an operator of the vehicle 110 located within a predetermined threshold distance from the refueling device 130 (step 340). It will be appreciated that, in some aspects, the sensors that are configured to scan the identifying characteristics of the vehicle 110 and/or the operator of the vehicle 110 may be implemented as devices that are not integrated into the structure of the refueling device 130, but as devices that are mounted on a horizontal or vertical support somewhere else at the vehicle refueling station 120.

As mentioned above, in some aspects, each of the first and second sensors 135, 137 is configured for communication with the retailer computing device 150 over the network 115, which enables the first and second sensors 135, 137 to transmit all scan data acquired by the first and second sensors 135, 137 to one or more devices separate and distinct from the refueling device 130, for example, to the retailer computing device 150 and/or the electronic database 160. To that end, the method 300 includes providing an electronic database 160 in communication over the network 115 with the retailer computing device 150 (step 350). As discussed above, in some embodiments, the electronic database 160 stores data including, but not limited to vehicle identification data associated with the customers of the retailer authorized to refuel at the vehicle refueling station 120, and personal identification data associated with the customers of the retailer authorized to refuel at the vehicle refueling station 120.

In some embodiments, when a vehicle 110 enters the vehicle refueling station 120 and travels to within a predetermined threshold distance (e.g., 2 feet, 3 feet, 4 feet, 5 feet, 6 feet, 10 feet, etc.) from an available refueling device 130, the first sensor 135 scans the vehicle 110 in order to obtain the identifying characteristics of the vehicle 110 that are used in the method 300 to authenticate the vehicle 110. To that end, the method 300 includes scanning, via the first sensor 135, the identifying characteristics of the vehicle 110 when the vehicle 110 is located within a predetermined threshold distance from the refueling device 130 (step 360).

In some aspects, the first sensor 135 scans a combination of letters and numbers on a license plate of the vehicle 110 by, for example, snapping a digital photograph and generating a digital image of the license plate of the vehicle 110. In one aspect, such a digital image is sent to an optical character recognition module (which may be embedded into the retailer computing device 150 and/or the refueling device 130) configured to decode the digital image and extract the numbers/letters on the licensed plate from the image. In some embodiments, instead of scanning the license plate of the vehicle 110, the first sensor 135 scans the identifying characteristics of the vehicle 110 by receiving vehicle-identifying signals from one or more transmitter devices 170 (e.g., V2V device, V2X device, RFID transponder/digital card, Wifi hotspot, Apple CarPlay, Android Auto, or the like) integrally incorporated into or otherwise located in (or mounted on) the vehicle 110, and configured to transmit, when scanned by the first sensor 135, wireless signals uniquely identifying the vehicle 110.

As discussed above, in addition to scanning the vehicle 110 that has entered the vehicle refueling station 120 and moved within a predetermined threshold distance (e.g., 2 feet, 3 feet, 4 feet, 5 feet, 6 feet, 10 feet, etc.) from an available refueling device 130, the second sensor 137 scans the operator of the vehicle 110 in order to obtain the identifying characteristics of the operator of the vehicle 110 that are used in the method 300 to authenticate the operator of the vehicle 110. To that end, the method 300 includes scanning, via the second sensor 137, the identifying characteristics of the operator of the vehicle 110 when the vehicle 110 is located within a predetermined threshold distance from the refueling device 130 (step 370). In some aspects, the second sensor 137 scans the face of the operator of the vehicle 110. The scan may include but is not limited to a digital still image, a digital moving image, a biometric scan, or the like. In another aspect, the second sensor 137 may scan the finger of the operator. In yet another aspect, the second sensor 137 may scan a phrase spoken by the operator of the vehicle 110 to acquire the voice pattern of the operator of the vehicle 110 and/or the verbal phrase (e.g., password) spoken by the operator of the vehicle 110. In one aspect, the second sensor 137 scans for wireless signals uniquely identifying the personal electronic device 180 of the operator.

After the first sensor 135 acquires vehicle identification data by scanning the vehicle 110 and after the second sensor 137 acquires personal identification data by scanning the operator of the vehicle 110, the next step is to verify that the acquired vehicle identification data and the personal identification data match the vehicle identification data and personal identification data predefined by authorized customers of the retailer when setting up an account with the retailer. To that end, the exemplary method 300 of FIG. 3 includes analyzing, via the retailer computing device 150, the scanned identifying characteristics of the vehicle 110 and the scanned identifying characteristics of the operator of the vehicle 110 in view of the vehicle identification data and the personal identification data stored in the electronic database 160 (step 380). This analysis enables the retailer computing device 150 to determine whether the scanned identifying characteristics of the vehicle 110 and the scanned identifying characteristics of the operator of the vehicle 110 correspond to (i.e., match) the vehicle identification data and the personal identification data stored in the electronic database 160 in association with a customer of the retailer authorized to refuel at the vehicle refueling station 120.

Notably, as discussed above, in some embodiments, the analysis of the scanned identifying characteristics of the vehicle 110 and the scanned identifying characteristics of the operator of the vehicle 110 in view of the vehicle identification data and the personal identification data stored in the electronic database 160 is not performed by the control circuit 210 of the retailer computing device 150, but is instead performed by the control circuit 138 of the refueling device 130. As such, in some aspects, the authentication of the vehicle 110 and the operator of the vehicle 110 is performed by the refueling device 130 without having to communicate over the network 115 with the retailer computing device 150, or having to rely on the retailer computing device 150 to query the electronic database 160 in order to authenticate the vehicle 110 and the operator of the vehicle 110.

In some embodiments, in response to a determination by the retailer computing device 150 that scanned identifying characteristics of the vehicle 110 and the scanned identifying characteristics of the operator of the vehicle 110 obtained during the aforementioned scanning steps correspond to the vehicle identification data and the personal identification data stored in the electronic database 160 in association with the customer of the retailer who is authorized to refuel at the vehicle refueling station 120, the method 300 further includes authenticating via the retailer computing device 150 both the vehicle 110 and the operator of the vehicle 110 (step 390). Again, as discussed above, in some embodiments, this determination is not performed by the control circuit 210 of the retailer computing device 150, but is instead performed by the control circuit 138 of the refueling device 130. As such, in some aspects, the authentication of the scanned vehicle 110 and the operator of that vehicle 110 is performed by the refueling device 130 without having to communicate over the network 115 with the retailer computing device 150, or having to rely on the retailer computing device 150 to make the authentication determination with respect to the vehicle 110 and the operator of the vehicle 110.

In some implementations, after the operator of the vehicle 110 is identified and authenticated as a customer of the retailer who is authorized (e.g., has a membership account, subscription, etc.) to fill up at the refueling station 120 of the retailer, the retailer computing device 150 transmits a signal over the network 115 to the electronic database 160 to query the electronic database 160 regarding the membership status of the customer. If the membership status of the customer is expired, the retailer computing device 150 may transmit a notification to the personal electronic device 180 of the customer in order to prompt the customer to renew the membership with the purchase of the gasoline at the refueling station 120.

In some embodiments, after the operator of the vehicle 110 is identified and authenticated as a customer of the retailer who is authorized to fill up at the refueling station 120 of the retailer, the retailer computing device 150 transmits a signal over the network 115 to the electronic database 160 to query the electronic database 160 regarding the payment information (e.g., credit card information, bank account information, etc.) stored in the electronic database 160 in association with the customer. If the electronic database 160 does not include a payment method (or if the customer-predefined payment method has expired), in some aspects, the retailer computing device 150 may transmit a notification to the personal electronic device 180 of the customer in order to prompt the customer to enter new payment information in order to enable the customer to complete a purchase of gasoline at the refueling station 120. In one aspect, to provide additional security, after the retailer computing device 150 acquires the payment method (e.g., credit card, debit card, etc.) of the customer from the electronic database 160, the retailer computing device 150 may transmit a notification to the personal electronic device 180 of the customer in order to prompt the customer to enter an additional verification code (e.g., zip code, pin number, etc.) directly into the personal electronic device 180 of the customer in order to authorize the retailer computing device 150 to charge the acquired payment method for the customer's fill up of the vehicle 110 at the refueling station 120. Notably, in some embodiments, the vehicle 110 includes a V2X device, and the retailer computing device 150 transmits a notification to the V2X device in the vehicle 110 in order to prompt the customer to enter an additional verification code (e.g., zip code, pin number, etc.) directly using the V2X device in order to authorize the retailer computing device 150 to charge the acquired payment method for the customer's fill up of the vehicle 110 at the refueling station 120.

In some embodiments, after the operator of the vehicle 110 is identified and authenticated as a customer of the retailer who is authorized to fill up at the refueling station 120 of the retailer, and after the retailer computing device 150 verifies that the authorized customer has a valid form of payment stored in the electronic database 160, the retailer computing device 150 transmits an activation signal over the network 115 to the refueling device 130. To that end, the exemplary method 300 of FIG. 3 includes transmitting a signal, from the retailer computing device 150 to the refueling device 130, in order to activate the refueling device 130 and to cause the refueling device 130 to refuel the authenticated vehicle 110 of the authenticated operator (step 395). For example, in one aspect, the retailer computing device 150 transmits an activation signal to the vehicle refueling device 130, which when processed by the control circuit 138 of the vehicle refueling device 130, causes the control circuit 138 to activate the gasoline dispenser 142 to refuel the vehicle 110 of the customer.

In some aspects, after both the vehicle 110 and the operator of the vehicle 110 are authenticated, the retailer computing device 150 transmits a signal over the network 115 to the electronic database 160 to obtain from the electronic database 160 the gasoline grade preferences (e.g., 87, 89, 91, 92, 93 octane, diesel, etc.) predefined by the vehicle operator when setting up an account. In one aspect, the retailer computing device 150 transmits a signal over the network 115 to the electronic database 160 to obtain from the electronic database 160 the membership status (e.g., regular, gold, platinum, etc.) of the customer, and the price of gasoline to be provided to the customer based on the customer's membership status. In some aspects, the retailer computing device 150 transmits a signal over the network 115 to the refueling device 130 to activate the refueling device 130 to dispense (via the gasoline dispenser 142) the gasoline grade predefined by the operator (based on the information obtained from the electronic database 160) at the grade price associated in the electronic database 160 with the membership status of the operator.

In some embodiments, after the refueling device 130 refuels the vehicle 110 of the customer, the refueling device 130 transmits a notification over the network 115 to the retailer computing device 150 indicating how much gasoline was dispensed and the total price of the dispensed gasoline. After receiving this notification, the retailer computing device 150 generates and transmits, to the personal electronic device 180 of the customer, an electronic notification including a receipt indicating the amount of gas dispensed and the amount of money debited from the customer's predefined payment information. In some aspects, the retailer computing device 150 assigns reward points to the account of the customer after the customer has filled up his/her vehicle 110 at the vehicle refueling station 120. For example, in one aspect, after the sale of gasoline to the customer is complete, the retailer computing device 150 transmits an electronic notification to the electronic database 160 instructing the electronic database 160 to update (i.e., increase) the number of reward points associated in the electronic database 160 with the account of the customer by an amount appropriate (e.g., one point per one dollar, two points per one dollar, three points per one dollar, etc.) for the amount of money spent by the customer on filling up his/her vehicle at the refueling station 120.

The systems and methods described herein advantageously allow authorized customers of the retailer to fill up with gasoline without having to get out of their cars, providing an added convenience for the customers, which may attract more customers to the vehicle refueling stations of the retailer. Since the systems and methods described herein authenticate both the vehicle and the operator of the vehicle, the ability of unauthorized persons to fill up at the vehicle refueling stations of the retailer at the expense of the authorized customer, even when driving the vehicle of the customer, is advantageously reduced and/or eliminated.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of automatically refueling vehicles of authenticated customers having a membership with a retailer, the system comprising:
    a vehicle refueling station including at least one refueling device having a gasoline dispenser configured to couple to a vehicle and refuel the vehicle with gasoline;
    a computing device including a processor-based control unit and configured to communicate with the at least one refueling device over a network;
    a first sensor configured to scan identifying characteristics of an operator of the vehicle, the second sensor being in communication with the computing device over the network;
    an electronic database in communication over the network with the computing device, the electronic database being configured to store data including:
        personal identification data associated with the customers of the retailer authorized to refuel at the vehicle refueling station;
    wherein the control unit of the computing device is configured to:
        analyze the identifying characteristics of the operator scanned by the first sensor in view of the personal identification data stored in the electronic database to determine whether the scanned identifying characteristics of the operator of the vehicle correspond to the personal identification data stored in the electronic database in association with a customer of the retailer authorized to refuel at the vehicle refueling station;
        in response to a determination, by the control unit, that the scanned identifying characteristics of the operator correspond to the personal identification data stored in the electronic database in association with the customer of the retailer authorized to refuel at the vehicle refueling station, to:
            query the electronic database over the network to obtain membership status of the operator;
            in response to a determination by the control unit that the membership status of the operator is expired, transmit a notification signal from the computing device to a personal electronic device of the operator to permit the operator of the vehicle to renew the membership status via the personal electronic device by paying a membership fee;
            in response to a determination by the control unit that the membership status of the operator is valid, query the electronic database to obtain payment information of the operator; and
            in response to a determination by the control unit that the payment information of the operator is valid to cover a refuel of the vehicle of the operator, transmit a signal from the computing device to the refueling device to activate the refueling device and refuel the vehicle of the operator.

2. The system of claim 1, further comprising a second sensor configured to detect a presence of the vehicle when the vehicle is located within a predetermined threshold distance from the refueling device, wherein the first sensor is configured to be activated in response to a detection by the second sensor of the vehicle located within a predetermined threshold distance from the refueling device.

3. The system of claim 1, wherein the first sensor is configured to: scan a face of the operator of the vehicle; detect a verbal password spoken by the operator of the vehicle; and receive a signal from a personal electronic device of the operator of the vehicle that uniquely identifies the personal electronic device of the operator of the vehicle.

4. The system of claim 1, wherein:
    the first sensor is configured to transmit over the network to the computing device, the identifying characteristics of the operator scanned by the first sensor;
    the computing device is configured to query the electronic database over the network, to obtain the personal identification data stored in the electronic database in association with customers of the retailer authorized to refuel at the vehicle refueling station; and
    the computing device is configured to authenticate the operator scanned by the first sensor in response to a determination by the computing device that the scanned identifying characteristics of the scanned operator correspond to the personal identification data stored in the electronic database in association with the customer of the retailer authorized to refuel at the vehicle refueling station.

5. The system of claim 1, wherein the computing device is further configured to:
    query the electronic database over the network to obtain both gasoline grade preferences predefined by the operator and stored in the electronic database and gasoline grade price stored in the electronic database in association with the membership status of the operator; and
    transmit a signal to the refueling device to activate the refueling device to dispense the gasoline grade predefined by the operator at the grade price associated in the electronic database with the membership status of the operator.

6. The system of claim 1, wherein the computing device is further configured to:

receive a signal from the refueling device over the network, the received signal indicating an amount of gasoline dispensed by the refueling device into the vehicle and an amount of money corresponding to the amount of gasoline dispensed by the refueling device into the vehicle; and transmit a signal to the electronic database over the network to debit the payment information of the operator stored in the electronic database for the amount of money indicated in the signal received by the computing device from the refueling device.

7. The system of claim 6, wherein the computing device is further configured to:
generate a reward credit for the operator for the amount of money spent by the operator during refueling of the vehicle of the operator at the vehicle refueling station of the retailer; and
transmit a signal to the electronic database to store the generated reward credit in the electronic database in association with the identifying characteristics of the operator.

8. The system of claim 1, wherein:
in response to the query, the computing device receives information indicating that the membership status of the operator is that the operator is not a member with the retailer, transmit a notification signal from the computing device to a personal electronic device of the operator to permit the operator of the vehicle to purchase a new membership via the personal electronic device by paying a membership fee;
in response to a determination by the control unit that the operator purchased a new membership, permit the operator to add the payment information of the operator to cover a refuel of the vehicle of the operator by the refueling device.

9. The system of claim 1, wherein the at least one refueling device is configured to remove a cap covering a fuel tank of the vehicle of the operator, to move a nozzle of the at least one refueling device into an opening of the fuel tank, and to return the cap to a position covering the fuel tank of the vehicle of the operator.

10. The system of claim 1, wherein, in response to a determination by the control unit that the refueling device completed refueling the vehicle of the operator, transmit an electronic notification from the computing device to the personal electronic device of the operator the electronic notification including a receipt for the refueling of the vehicle of the operator.

11. A method of automatically refueling vehicles of authenticated customers having a membership with a retailer, the method comprising:
providing a vehicle refueling station including at least one refueling device having a gasoline dispenser configured to couple to a vehicle and refuel the vehicle with gasoline;
providing a computing device including a processor-based control unit and configured to communicate with the at least one refueling device over a network;
providing a first sensor configured to scan identifying characteristics of an operator of the vehicle, the second sensor being in communication with the computing device over the network;
providing an electronic database in communication over the network with the computing device, the electronic database being configured to store data including personal identification data associated with the customers of the retailer authorized to refuel at the vehicle refueling station;
analyzing, via the control unit, the identifying characteristics of the operator scanned by the first sensor in view of the personal identification data stored in the electronic database to determine whether the scanned identifying characteristics of the operator of the vehicle correspond to the personal identification data stored in the electronic database in association with a customer of the retailer authorized to refuel at the vehicle refueling station;
in response to a determination, by the control unit, that the scanned identifying characteristics of the operator correspond to the personal identification data stored in the electronic database in association with the customer of the retailer authorized to refuel at the vehicle refueling station, querying the electronic database over the network to obtain membership status of the operator;
in response to a determination by the control unit that the membership status of the operator is expired, transmitting, from the computing device, a notification signal to a personal electronic device of the operator to permit the operator of the vehicle to renew the membership status via the personal electronic device by paying a membership fee;
in response to a determination by the control unit, that the membership status of the operator is valid, querying the electronic database to obtain payment information of the operator; and
in response to a determination by the control unit that the payment information of the operator is valid to cover a refuel of the vehicle of the operator, transmitting from the computing device a signal to the refueling device to activate the refueling device and refuel the vehicle of the operator.

12. The method of claim 11, further comprising:
providing a second sensor configured to detect a presence of the vehicle when the vehicle is located within a predetermined threshold distance from the refueling device; and
activating the first sensor in response to a detection by the second sensor of the vehicle located within a predetermined threshold distance from the refueling device.

13. The method of claim 11, wherein the scanning, via the first sensor, identifying characteristics of the operator of the vehicle includes: scanning a face of the operator of the vehicle; detecting a verbal password spoken by the operator of the vehicle; and receiving a signal from a personal electronic device of the operator of the vehicle that uniquely identifies the personal electronic device of the operator of the vehicle.

14. The method of claim 11, further comprising:
transmitting, via the first sensor and over the network to the computing device, the identifying characteristics of the operator scanned by the first sensor;
querying the electronic database, via the computing device and over the network, to obtain the personal identification data stored in the electronic database in association with customers of the retailer authorized to refuel at the vehicle refueling station; and
authenticating, via the computing device, the operator scanned by the first sensor in response to a determination by the computing device that the scanned identifying characteristics of the scanned operator correspond to the personal identification data stored in the electronic database in association with the customer of the retailer authorized to refuel at the vehicle refueling station.

15. The method of claim 11, wherein the transmitting the signal, from the computing device to the refueling device to activate the refueling device, further comprises:
   querying the electronic database, via the computing device and over the network, to obtain both gasoline grade preferences predefined by the operator and stored in the electronic database and gasoline grade price stored in the electronic database in association with a membership status of the operator; and
   transmitting a signal, from the computing device to the refueling device to activate the refueling device to dispense the gasoline grade predefined by the operator at the grade price associated in the electronic database with the membership status of the operator.

16. The method of claim 11, further comprising:
   receiving a signal from the refueling device over the network at the computing device, the received signal indicating an amount of gasoline dispensed by the refueling device into the vehicle and an amount of money corresponding to the amount of gasoline dispensed by the refueling device into the vehicle; and
   transmitting a signal, from the computing device to the electronic database to debit the payment information of the operator stored in the electronic database for the amount of money indicated in the signal received by the computing device from the refueling device.

17. The method of claim 16, wherein the transmitting a signal, from the computing device to the electronic database to debit the payment information of the operator stored in the electronic database for the amount of money indicated in the signal received by the computing device from the refueling device further comprises:
   generating a reward credit for the operator for the money spent by the operator during refueling of the vehicle of the operator at the vehicle refueling station of the retailer; and
   transmitting a signal, from the computing device to the electronic database to store the generated reward credit in the electronic database in association with the identifying characteristics of the operator.

18. The method of claim 11, further comprising:
   in response to the query, the computing device receives information indicating that the membership status of the operator is that the operator is not a member with the retailer, transmitting a notification signal from the computing device to a personal electronic device of the operator to permit the operator of the vehicle to purchase a new membership via the personal electronic device by paying a membership fee; and
   in response to a determination by the control unit that the operator purchased a new membership, permitting the operator to add the payment information of the operator to cover a refuel of the vehicle of the operator by the refueling device.

19. The method of claim 11, further comprising by the at least one refueling device: removing a cap covering a fuel tank of the vehicle of the operator, moving a nozzle of the at least one refueling device into an opening of the fuel tank; and returning the cap to a position covering the fuel tank of the vehicle of the operator.

20. The method of claim 11, further comprising, in response to a determination by the control unit that the refueling device completed refueling the vehicle of the operator, transmitting an electronic notification from the computing device to the personal electronic device of the operator the electronic notification including a receipt for the refueling of the vehicle of the operator.

* * * * *